(12) United States Patent
Liu et al.

(10) Patent No.: US 7,149,034 B2
(45) Date of Patent: Dec. 12, 2006

(54) ASSESSING MARK FOR MICROLENS (75) Inventors: En-Ting Liu, Kao-Hsiung (TW); Chien-Hao Chen, Tai-Nan (TW); Hsin-Wei Lin, Kao-Hsiung Hsien (TW); Der-Yu Chou, Miao-Li Hsien (TW)

(73) Assignee: United Microelectronics Corp., Hsin-Chu (TW)

( * ) Notice: Subject to any disclaimer, the term of this patent is extended or adjusted under 35 U.S.C. 154(b) by 54 days.

(21) Appl. No.: 10/906,939

(22) Filed: Mar. 14, 2005

(65) Prior Publication Data

US 2006/0203348 A1    Sep. 14, 2006

(51) Int. Cl.
*G02B 27/10* (2006.01)

(52) U.S. Cl. ............................ 359/619; 65/378; 65/380

(58) Field of Classification Search ........ 359/618–620; 65/378, 380, 385; 264/1.1, 1.32, 15
See application file for complete search history.

(56) References Cited

U.S. PATENT DOCUMENTS 6,639,726 B1 * 10/2003 Campbell .................. 359/619

* cited by examiner

*Primary Examiner*—Hung X. Dang
*Assistant Examiner*—Joseph Martinez
(74) *Attorney, Agent, or Firm*—Winston Hsu (57) ABSTRACT

An assessing mark of microlens array fabricated in a scribe line region includes two vertical line patterns arranged substantially in parallel with each other, and a horizontal line pattern connecting the vertical line patterns. The vertical line patterns and horizontal line pattern define an inner index path. When treated by baking process, the two vertical line patterns are fluidized due to heat and partially merge together from the horizontal line pattern of the assessing mark along the inner index path.

9 Claims, 10 Drawing Sheets

ASSESSING MARK FOR MICROLENS

BACKGROUND OF INVENTION

1. Field of the Invention

The present invention relates generally to the field of microlens manufacturing. More particularly, the present invention relates to an assessing mark laid on the scribe lines, which is used to assess the conditions and quality of the microlens array.

2. Description of the Prior Art

Microlens technology is widely used in various optoelectronical products such as color digital cameras, and endoscopes. The microlens is used to control the traveling directions of each light ray, so that the light can be precisely converged or diverged upon light sensing areas. Furthermore, through the control of digital devices, light and electricity can be interchanged digitally with each other.

For example, the converged digital camera is usually constituted by superimposing color filter arrays (CFA) either on a charge-coupled device (CCD) image sensor or on a complementary metal-oxide-semiconductor (CMOS) image sensor. In general, CFA contains three or more color filter channels arranged alternately, where each color filter channel only lets light with a specific frequency pass through, projecting to the corresponding image sensor. Therefore, the color of the image is interpreted by CFA, and then transferred to each corresponding sensor device for further processing. Furthermore, microlens arrays coupled with CFA can be used to focus the light rays, so that either the layout area of each sensor device on the substrate can be increased or the integrity can be raised.

Figure 1:
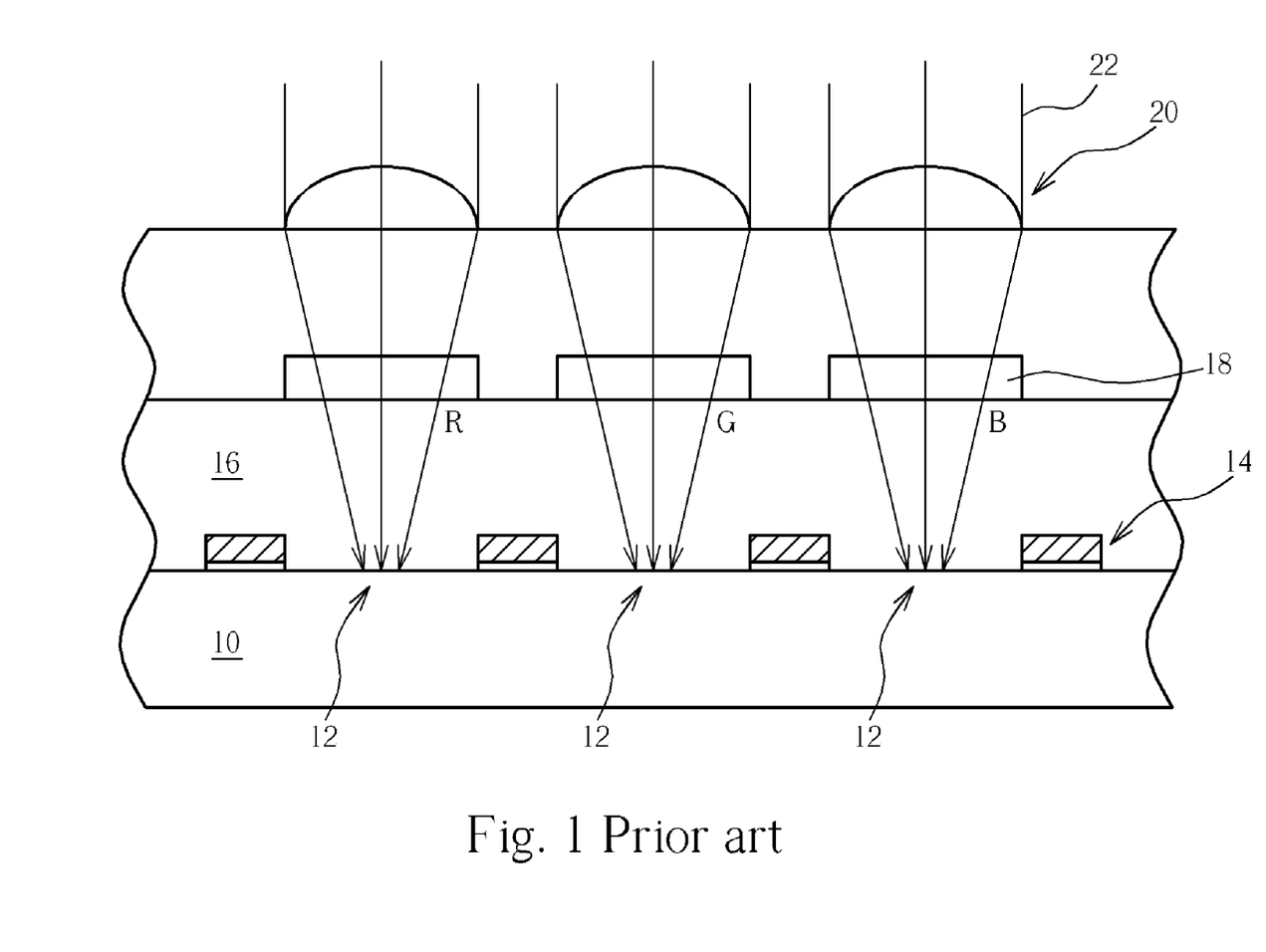
FIG. 1 illustrates the cross-sectional view of the prior art sensor chip structure containing the microlens array and the sensor device.
Figure 2:
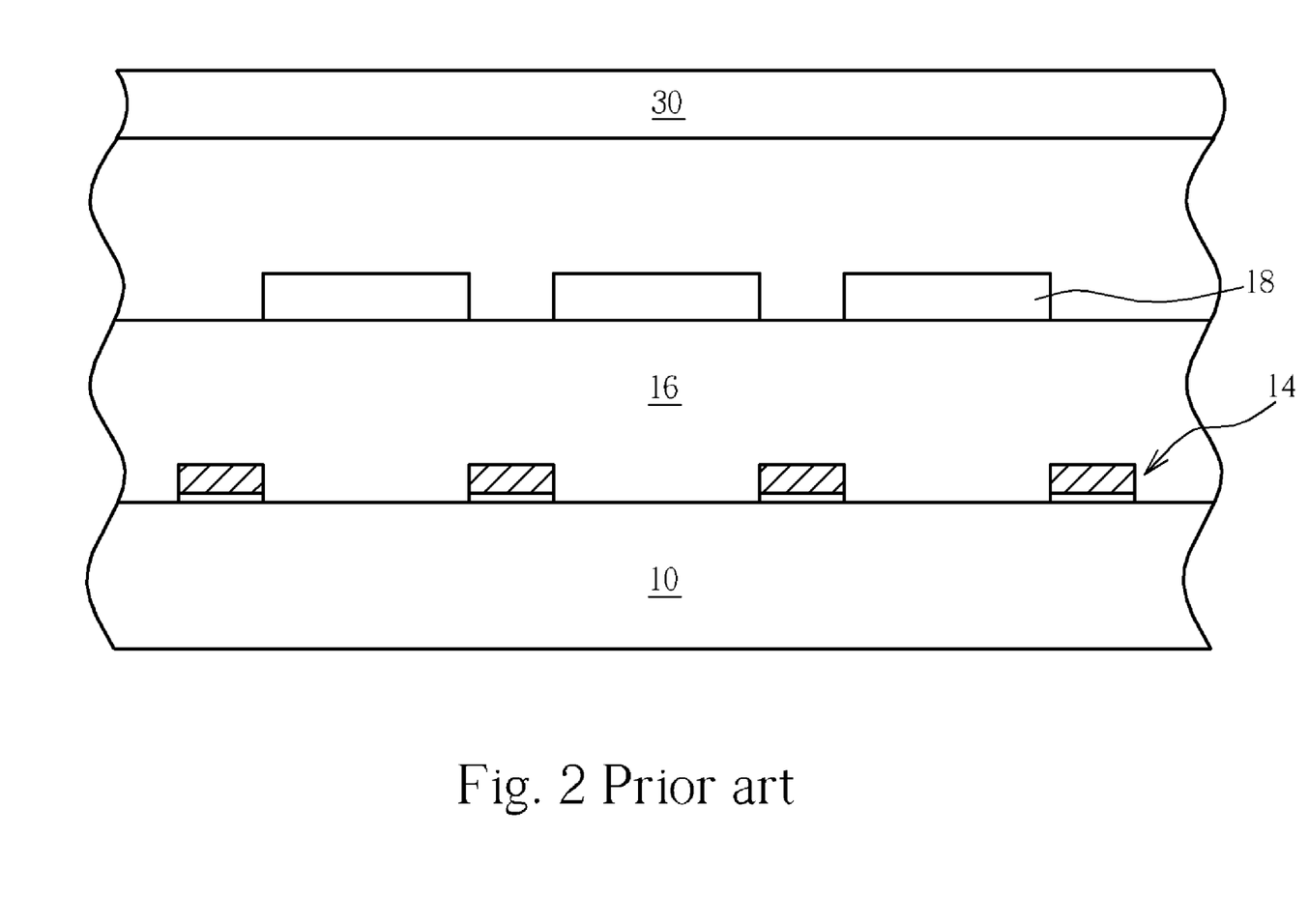
FIG. 2 to FIG. 4 shows the process steps for forming a microlens array according to a prior art method.
Figure 3:
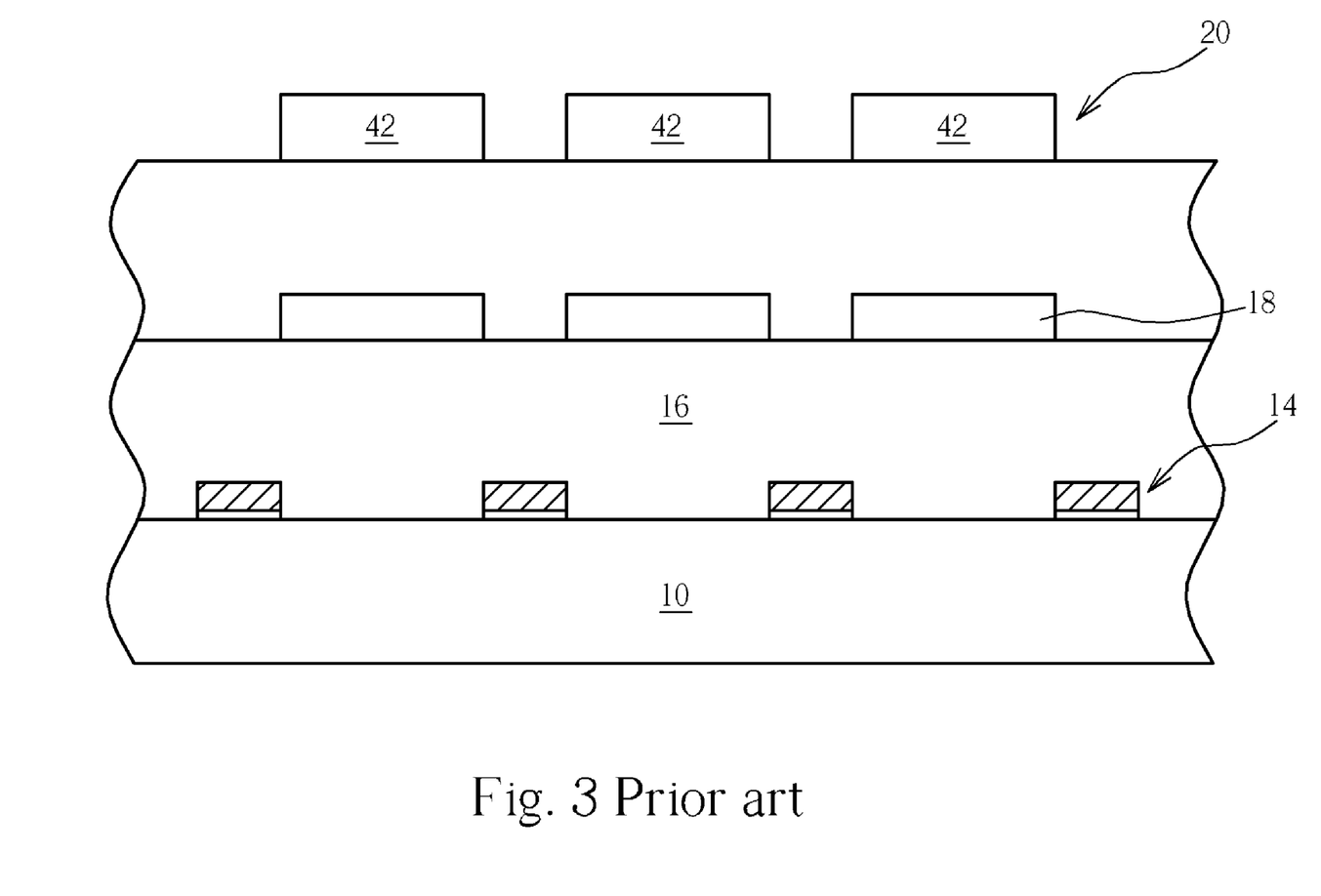
Figure 4:
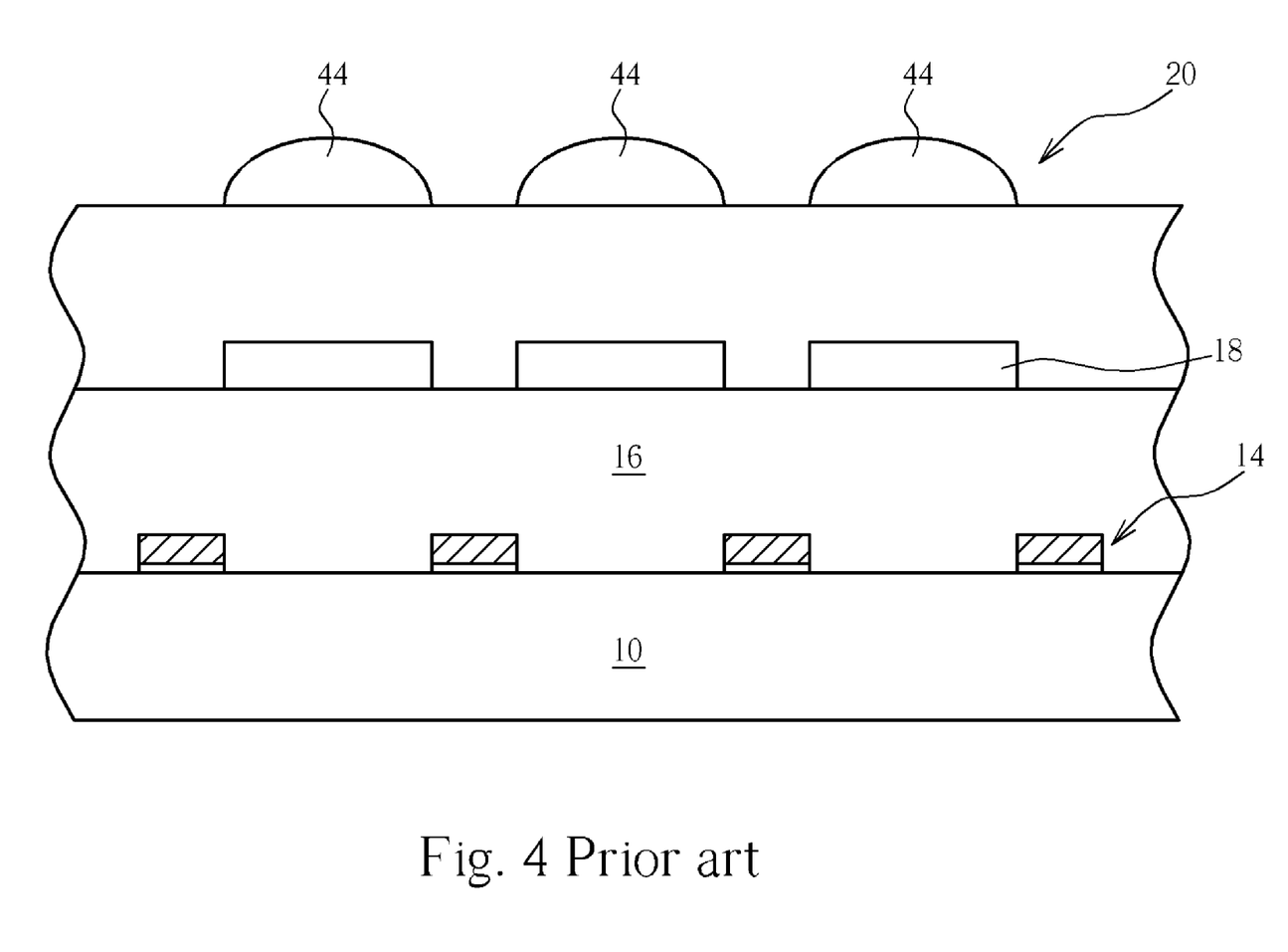

Referring to FIG. 1, illustrating the cross-sectional view of the prior art sensor chip structure containing the microlens array and the sensor device, light-sensitive regions 12 are formed in a chip substrate 10. Sensor devices 14, for example, CCD or CMOS, are formed on the substrate 10. A planarized transparent layer 16 is formed on the substrate 10, with a CFA layer 18 formed thereon. The microlens array 20 is formed above the CFA layer 18, which refract light rays 22 coming from the outside to focus on the light-sensitive regions 12. Typically, the microlens array 20 is fabricated using the process steps set forth in FIG. 2 to FIG. 4. First, a microlens resist layer 30 is coated over the CFA layer 18. A lithographic process is then carried out to form a microlens array 20 comprising a plurality of resist blocks 42. Subsequently, the resist blocks 42 are subjected to a thermal baking process, and are melted and cured to form semispherical shaped microlens 44.

Hitherto, none of the prior art provides a monitoring pattern in the scribe line region of a sensor chip or die for inspecting the baking conditions of the microlens array. Conventionally, to judge the conditions (baked or not baked) of the microlens, the wafer is put under an optical microscope, and the microlens array thereof is inspected by the human eye and sorted according to the reflected light patterns. However, as the microlens array gets thinner, it becomes more difficult to discern between the reflected light pattern before baking and that after baking. Furthermore, the aforesaid inspection method cannot assess the quality of the microlens after baking.

SUMMARY OF INVENTION

It is therefore the primary object of the present invention to provide an assessing mark for inspecting and monitoring the conditions and quality of the microlens array.

It is another object of the present invention to provide an assessing mark for inspecting the conditions of the microlens array, which is not according to the reflected light patterns of the microlens array.

In one exemplary embodiment of the present invention, an assessing mark of microlens array fabricated in a scribe line region includes two vertical line patterns arranged substantially in parallel with each other, and a horizontal line pattern connecting the vertical line patterns. The vertical line patterns and horizontal line pattern define an inner index path. When treated by baking process, the two vertical line patterns are fluidized due to heat and partially merge together from the horizontal line pattern of the assessing mark along the inner index path.

In another exemplary embodiment of the present invention, an assessing mark of microlens array fabricated in a scribe line region includes two serpentine line patterns arranged substantially in parallel with each other, and a connection line pattern connecting the serpentine line patterns, wherein the two serpentine line patterns and the connection line pattern define an serpentine index path having at least two winded sections, wherein when treated by baking process, the two serpentine line patterns are fluidized due to heat and partially merge together from the connection line pattern of the assessing mark up along the serpentine index path.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 5:
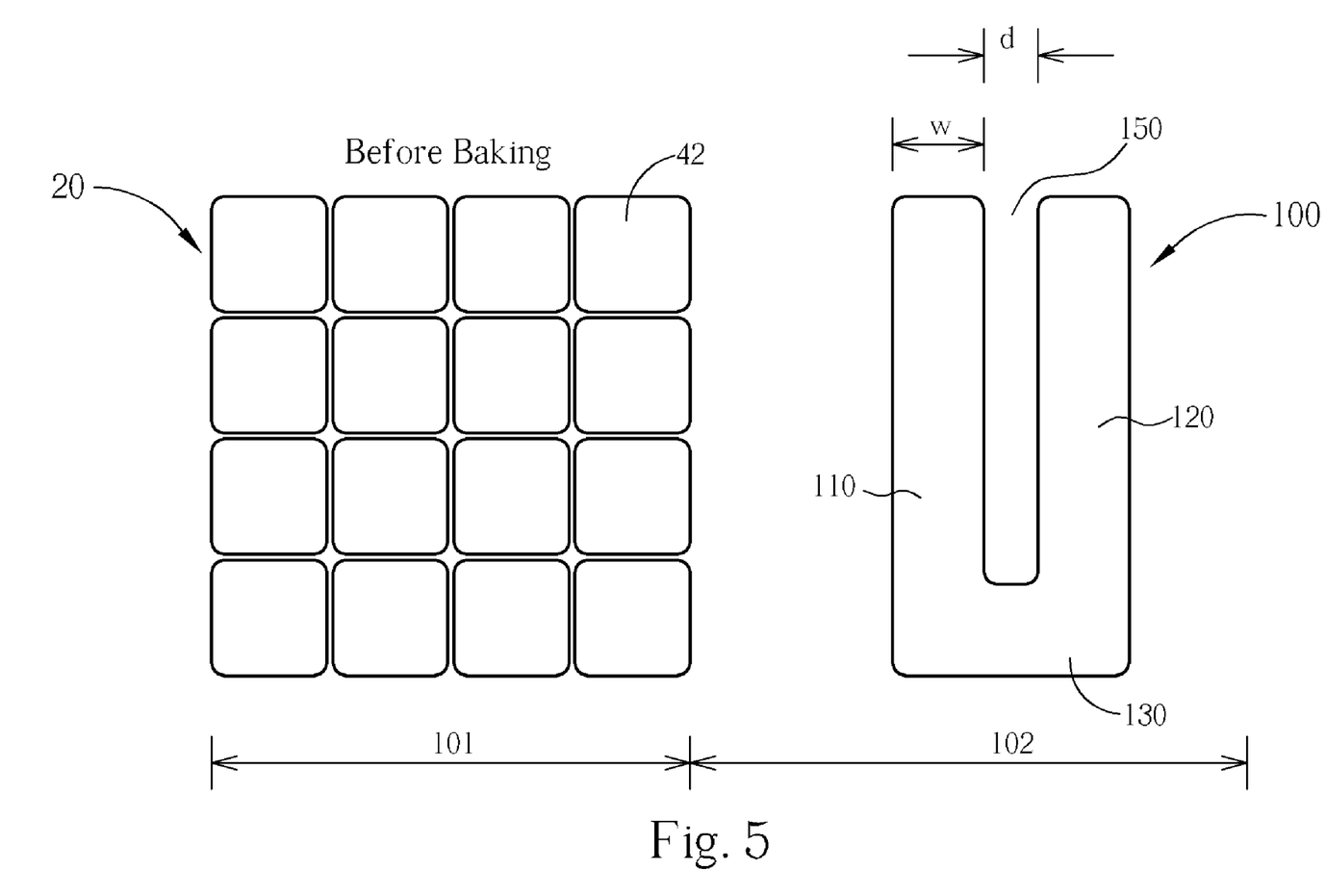
FIG. 5 is a schematic diagram illustrating the plan view of a microlens array and an assessing mark layout in accordance with one preferred embodiment of this invention.

FIG. 5 is a schematic diagram illustrating the plan view of a microlens array 20 and an assessing mark layout 100 in accordance with one preferred embodiment of this invention. As shown in FIG. 5, the microlens array 20 is patterned within the active circuit region 101 and comprises a plurality of resist blocks 42. The assessing mark layout 100 is formed simultaneously with the microlens array 20 and is patterned in the scribe line region 102. It is to be understood that the patterns shown in figures are not drawn to scale and are only for illustration purposes.

According to this embodiment, the assessing mark layout 100 is an U-shaped pattern having two vertical lines 110 and 120 in parallel with each other, and one horizontal line 130 that connects the two vertical lines 110 and 120. The vertical lines 110 and 120 and the horizontal line 130 have substantially the same line width "w". The horizontal line 130 and vertical lines 110 and 120 define an inner index path 150.

Figure 6:
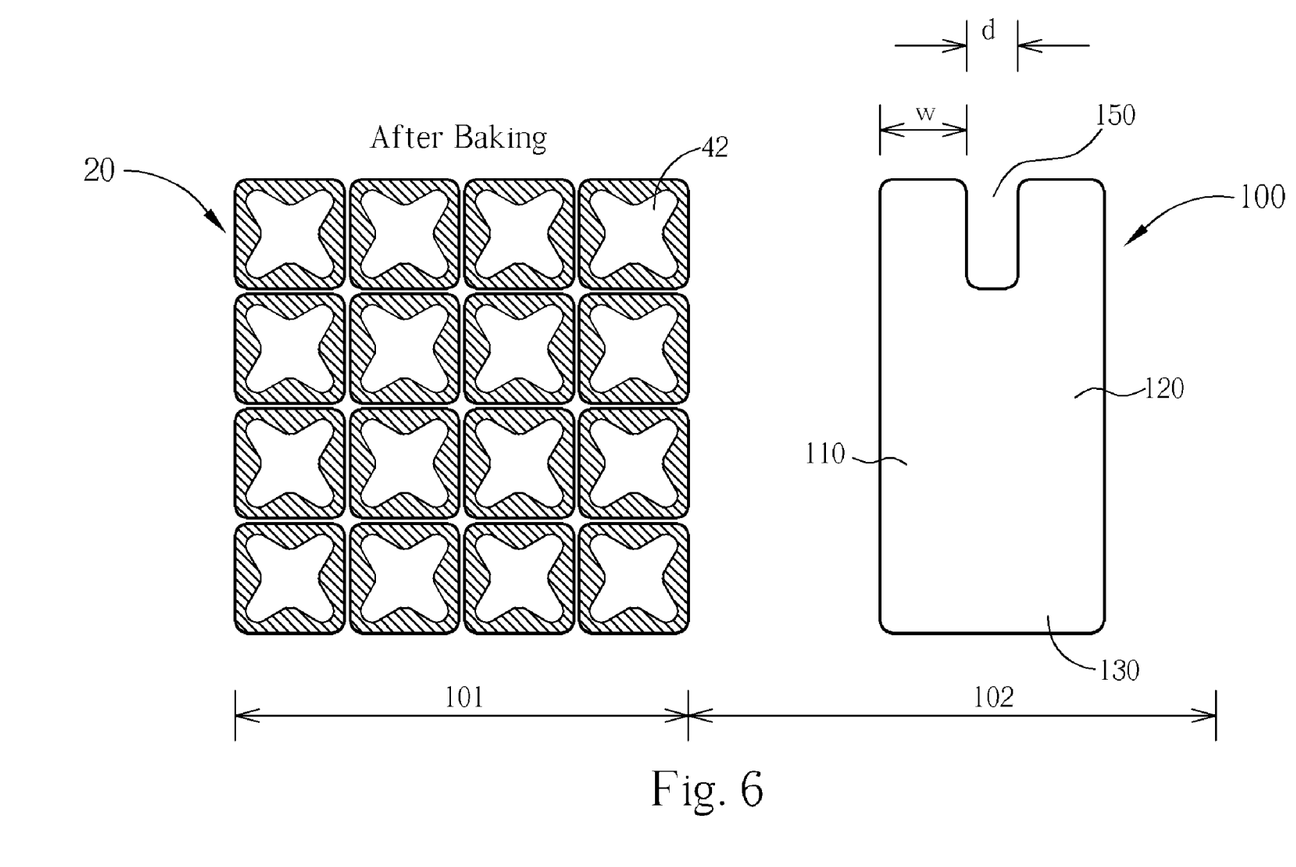
FIG. 6 is a schematic diagram illustrating the plan view of a microlens array and an assessing mark layout after baking in accordance with this invention.

FIG. 6 is a schematic diagram illustrating the plan view of a microlens array 20 and an assessing mark layout 100 after baking in accordance with this invention. As shown in FIG. 6, the two vertical lines 110 and 120 are fluidized due to the heat and partially merge together from the bottom, i.e., the horizontal line 130, of the U-shaped pattern along the inner index path 150 or along the length of the two vertical lines 110 and 120 because of surface tension. The spacing "d" between the two vertical lines 110 and 120 is controlled to an optimized value such that the two vertical lines 110 and 120 when fluidized due to the heat can partially merge together as indicated in FIG. 6.

Figure 7:
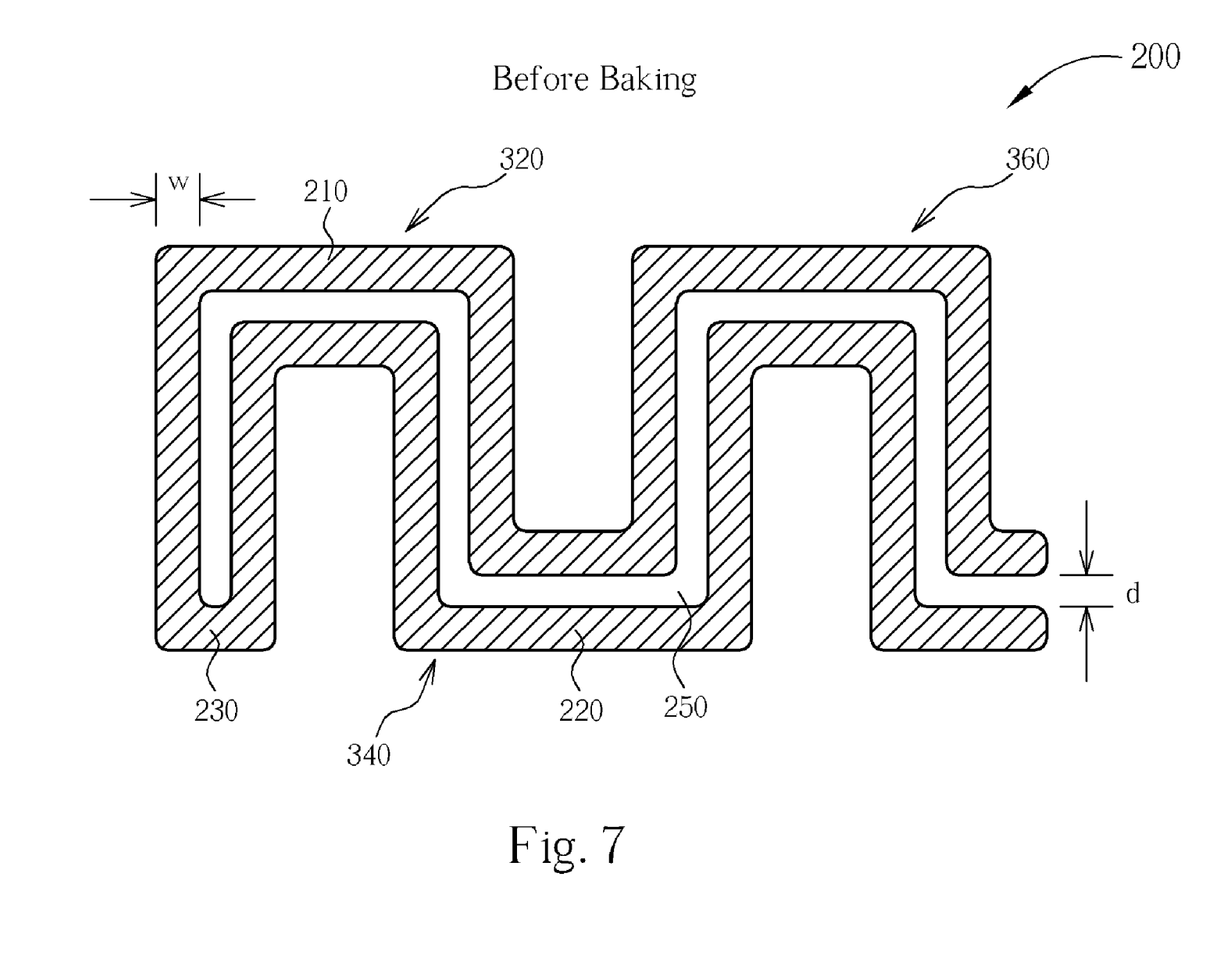
FIG. 7 is a schematic diagram showing an assessing mark layout in accordance with another preferred embodiment of this invention.

FIG. 7 is a schematic diagram showing an assessing mark layout 200 in accordance with another preferred embodiment of this invention. Likewise, the assessing mark layout 200 is formed on the scribe line region of the sensor chip wafer, simultaneously with the microlens array. As shown in FIG. 7, the assessing mark layout 200 has a first serpentine line pattern 210, a second serpentine line pattern 220 that is substantially in parallel with the first serpentine line pattern 210, and a third line pattern 230 that connects the first serpentine line pattern 210 and the second serpentine line pattern 220. The first serpentine line pattern 210, second serpentine line pattern 220, and third line pattern 230 define a serpentine index path 250, which has three winded sections 320, 340, and 360. The assessing mark layout 200 is designed to help inspectors easily assess the quality of the baked microlens array through an optical microscope.

Figure 8:
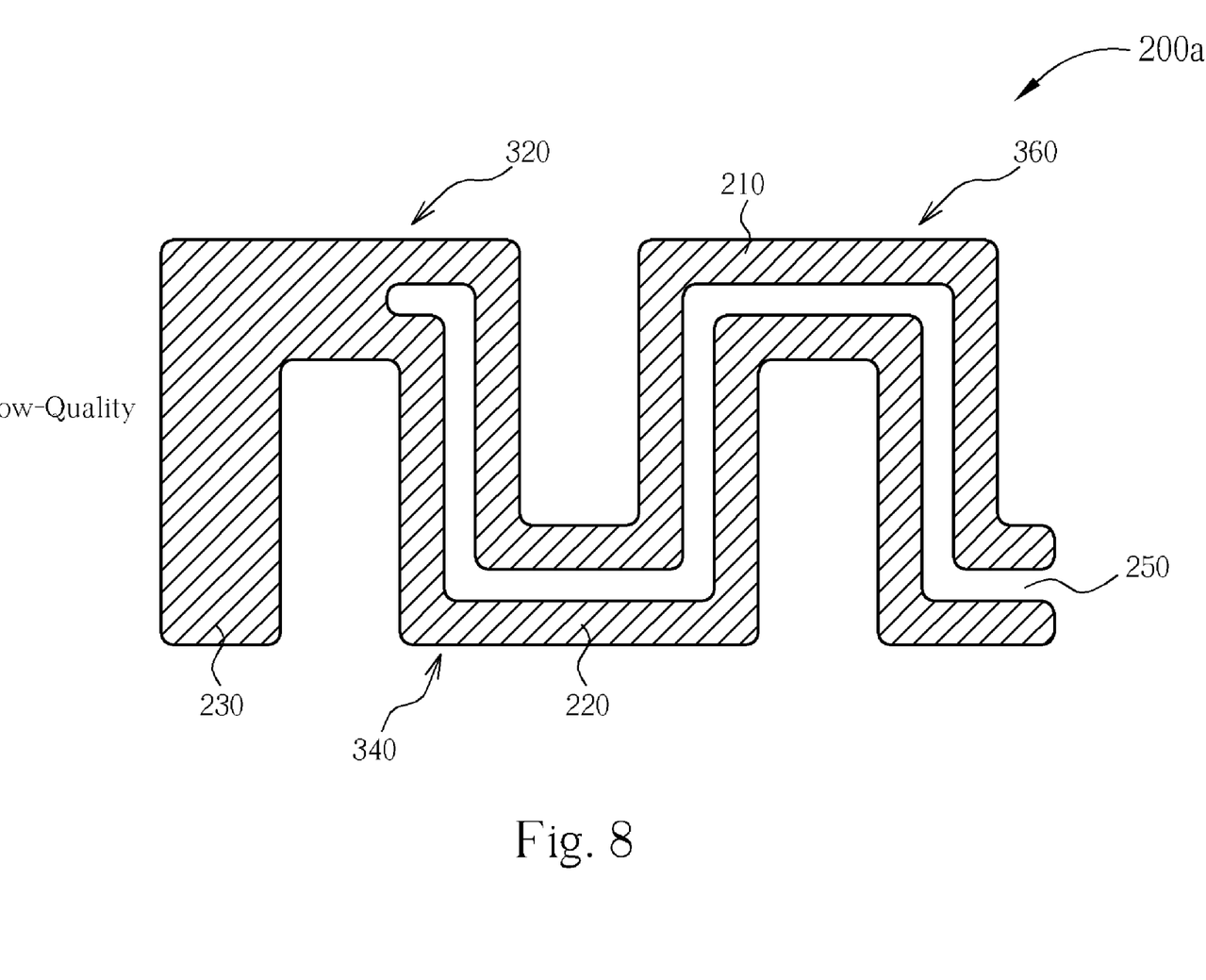
FIG. 8 and FIG. 9 depict assessing marks both indicating low quality of the microlens after treated by baking process.
Figure 9:
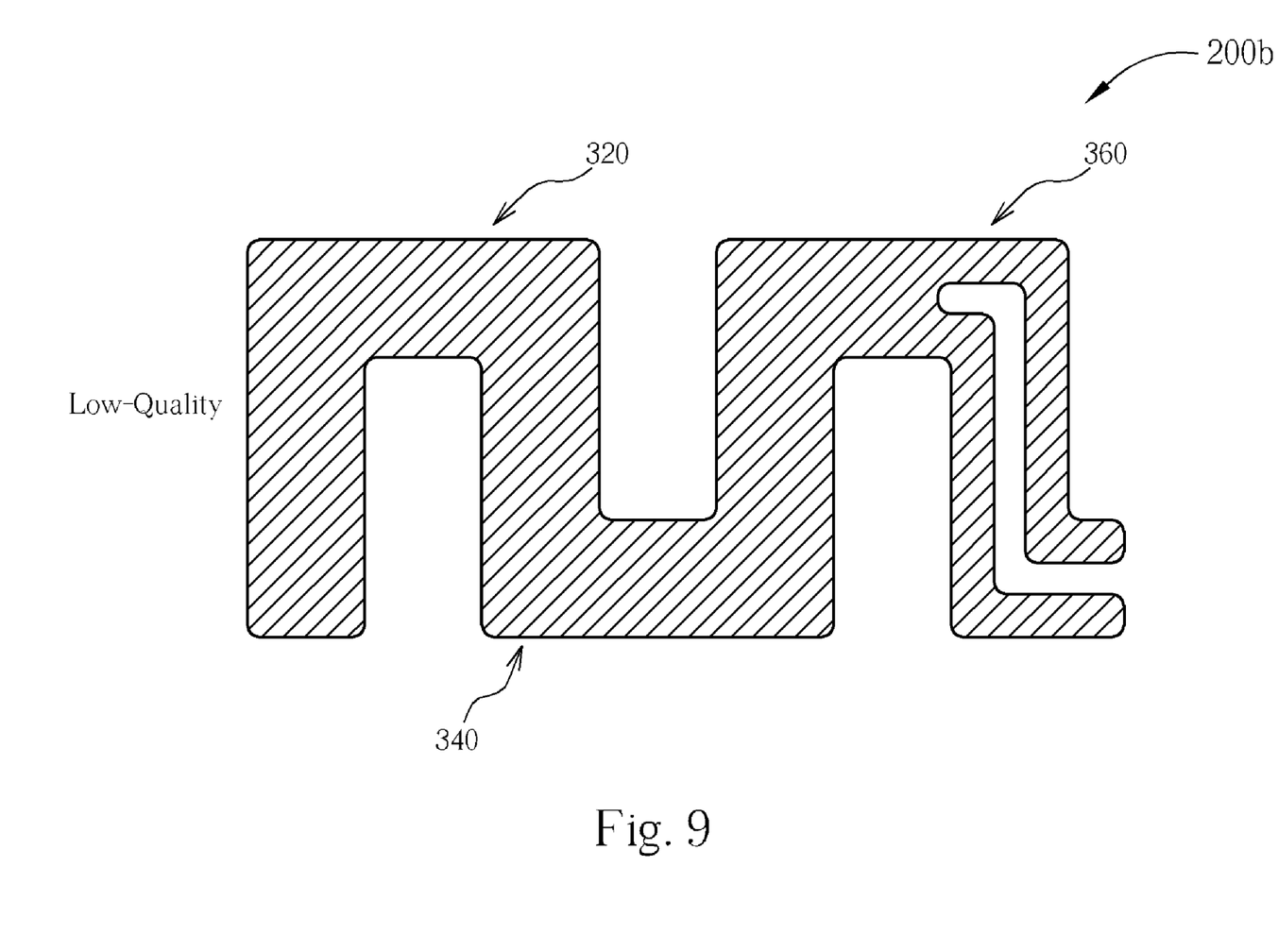

For example, referring to FIG. 8 and FIG. 9, assessing marks 200a and 200b both indicating low quality of microlens after treated by baking process are illustrated, respectively. As shown in FIG. 8, the merged portion only reaches the first winded section 320. This indicates that the baking or curing of the microlens array may be premature. As shown in FIG. 9, the merged portion traverses farther and reaches the third winded section 360. This indicates that the baking or curing of the microlens array should be shortened.

Figure 10:
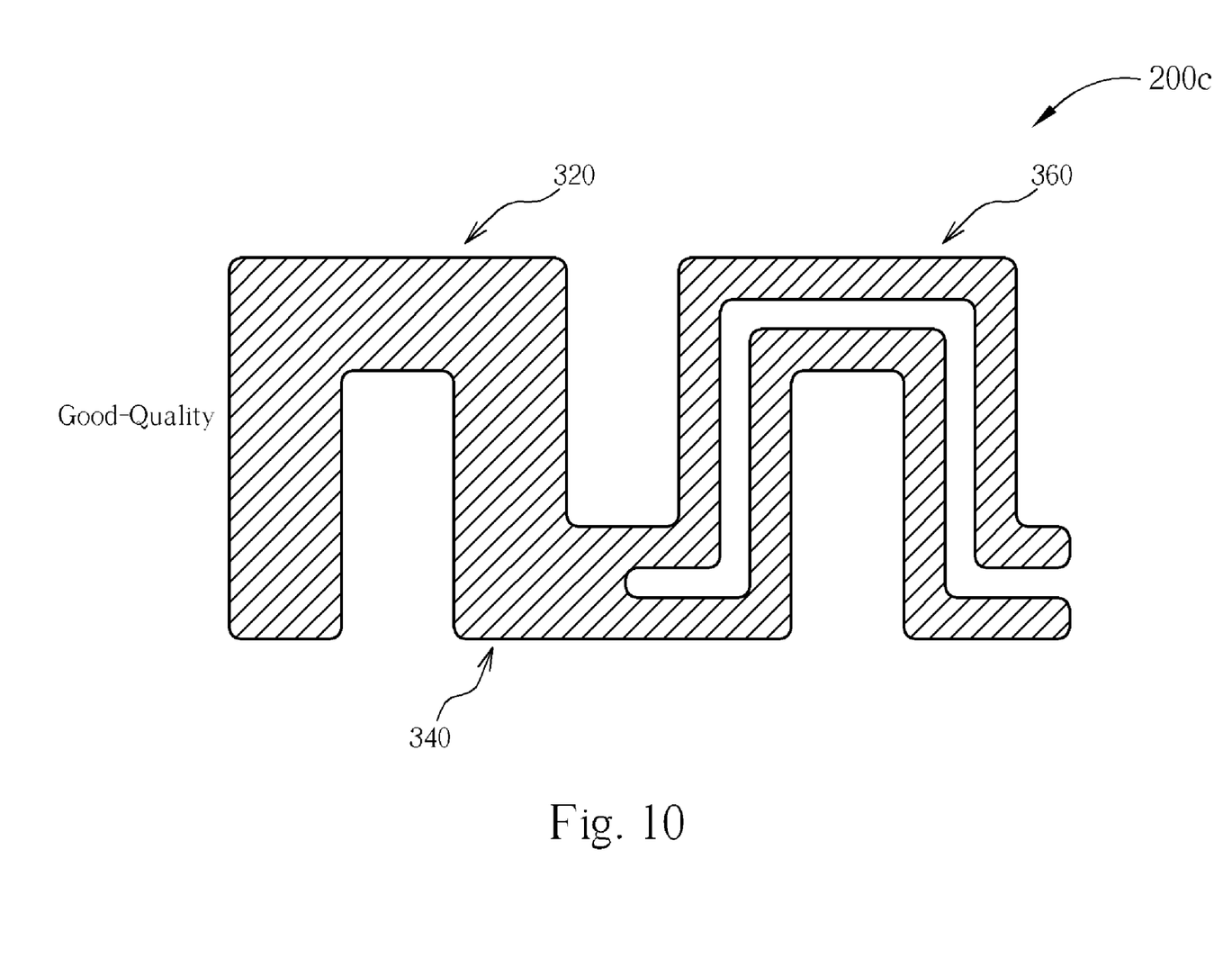
FIG. 10 shows an exemplary assessing mark indicating good quality of the microlens after treated by baking process.

Referring to FIG. 10, an exemplary assessing mark 200c indicating good quality of microlens after treated by baking process is illustrated. As shown in FIG. 10, an inspector can easily discern the assessing mark layout 200c having the merged portion reaching the second winded section 340 and indicate the microlens array is well treated and the quality thereof is good.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An assessing mark of microlens array, comprising two vertical line patterns arranged substantially in parallel with each other, and a horizontal line pattern connecting said vertical line patterns, wherein said two vertical line patterns and said horizontal line pattern define an inner index path, wherein when treated by baking process, said two vertical line patterns are fluidized due to heat and partially merge together from said horizontal line pattern of said assessing mark up along said inner index path.

2. The assessing mark of microlens array according to claim 1 wherein said assessing mark is U-shaped.

3. The assessing mark of microlens array according to claim 1 wherein said assessing mark is fabricated simultaneously with said microlens array.

4. The assessing mark of microlens array according to claim 1 wherein said vertical line patterns have substantially the same line width.

5. The assessing mark of microlens array according to claim 1 wherein said assessing mark is fabricated in a scribe line region.

6. An assessing mark of microlens array, comprising two serpentine line patterns arranged substantially in parallel with each other, and a connection line pattern connecting said serpentine line patterns, wherein said two serpentine line patterns and said connection line pattern define an serpentine index path having at least two winded sections, wherein when treated by baking process, said two serpentine line patterns are fluidized due to heat and partially merge together from said connection line pattern of said assessing mark up along said serpentine index path.

7. The assessing mark of microlens array according to claim 6 wherein said assessing mark is fabricated simultaneously with said microlens array.

8. The assessing mark of microlens array according to claim 6 wherein said assessing mark is fabricated in a scribe line region.

9. The assessing mark of microlens array according to claim 6 wherein if merged portion of said serpentine line patterns only reaches a first winded section, it indicates that said baking process is premature.

* * * * *